United States Patent [19]
Gras et al.

[11] Patent Number: 5,728,795
[45] Date of Patent: Mar. 17, 1998

[54] PROCESS FOR THE PREPARATION OF BLOCKED POLYISOCYANATES, AND THEIR USE IN POLYURETHANE COATING SYSTEMS

[75] Inventors: Rainer Gras, Bochum; Siegfried Brandt, Haltern, both of Germany

[73] Assignee: Huels Aktiengesellschaft, Marl, Germany

[21] Appl. No.: 622,283

[22] Filed: Mar. 25, 1996

Related U.S. Application Data

[62] Division of Ser. No. 351,165, Nov. 30, 1994, Pat. No. 5,541,279.

[30] Foreign Application Priority Data

Feb. 28, 1994 [DE] Germany ............... 44 06 443.8

[51] Int. Cl.[6] ............... C08G 18/81
[52] U.S. Cl. ............... 528/45; 524/315; 524/317; 524/360; 524/589; 524/590
[58] Field of Search ............... 528/45; 524/589, 524/590, 315, 317, 360

[56] References Cited

U.S. PATENT DOCUMENTS

| | | | |
|---|---|---|---|
| 4,055,550 | 10/1977 | Panandiker et al. | 260/77.5 AA |
| 4,535,142 | 8/1985 | Brauer et al. | 528/75 |
| 5,541,279 | 7/1996 | Gras et al. | 528/45 |

*Primary Examiner*—Melvyn I. Marquis
*Attorney, Agent, or Firm*—Oblon, Spivak, McClelland, Maier & Neustadt, P.C.

[57] ABSTRACT

The invention relates to a process for the preparation of totally or partially blocked polyisocyanates based on a blocking agent and on a polyisocyanate containing at least two free NCO groups, if desired in the presence of a chain extender, in which the totally or partially blocked polyisocyanates are prepared by a solvent-free and continuous procedure. This reaction is carried out in a static mixer or intensive kneading apparatus or extruder. The invention furthermore relates to the use of the totally or partially blocked polyisocyanates for PUR powder coatings and solvent-containing, one-component PUR stoving enamels.

2 Claims, No Drawings

PROCESS FOR THE PREPARATION OF BLOCKED POLYISOCYANATES, AND THEIR USE IN POLYURETHANE COATING SYSTEMS

This is a Division of application Ser. No. 08/351,165 filed on Nov. 30, 1994, now U.S. Pat. No. 5,541,279.

BACKGROUND OF THE INVENTION

FIELD OF THE INVENTION

The invention relates to a simple process for the preparation of totally or partially blocked polyisocyanates and to their use, in particular, in light-stable and weather-stable polyurethane (PUR) coating materials.

As crosslinking agents for the formulation of PUR coating systems, especially PUR power coatings, wide-spread use is made of blocked polyisocynanates, in particular aliphatic and/or (cyclo)aliphatic polyisocyanates, since these lead to light-colored products and, specifically, the cyclo(aliphatic) crosslinking agents can be ground and are therefore particularly suitable for the production of powder coatings.

In PUR powder coatings, which were first described in the literature in 1970, a leading position has been taken by the PUR powders disclosed in DE-C 27 35 497, owing to their superior weathering stability and thermal color stability.

In addition to blocked polyisocyanates which may contain isocyanurate groups, other oligomers are also known, such as polyisocyanates which contain urethane, biuret or urea groups and whose NCO groups are likewise blocked. In order to be able to produce stable two-component component coating systems, the blocking of the NCO groups is unavoidable for temporary protection. In this context mixtures are also used.

A common feature of all these blocked polyisocyanates is that they are synthesized batchwise in a reactor, as described in, for example, DE-C 27 12 931. Accordingly, the synthesis of the oligomers mentioned is carried out batchwise. Long reaction times at high temperatures are a disadvantage here, which may lead to discoloration of the reaction products. Furthermore, long reaction times mean high process costs.

Crosslinking agents based on isocyanurates, i.e. trimerized diisocyanates, have received particular interest because of their relatively high molecular weight and their functionality of ≧3, a prime example being the isocyanurate of 3-isocyanatomethyl-3,5,5-trimethylcyclohexyl isocyanate (isophorone diisocyanate, IPDI).

The high melt viscosity both of the isocyanurate and, even more so, of the blocked crosslinking agent necessitates high temperatures when the reactants are used directly, as is described in DE-C 27 12 931 and DE-C 33 28 130. Moreover, at these high temperatures which lead to instances of discoloration and cloudiness, there are already high concentrations present of free blocking agent and therefore, correspondingly, high concentrations of free—i.e. unblocked—NCO groups, since the reaction equilibrium is on the side of the starting materials to an undesirably high extent. In addition, the evaporation of the blocking agents causes odor pollution. Since this solvent-free route was fraught with problems, these crosslinking agents have hitherto been synthesized in solvent, at relatively low temperatures of from 80° to 100° C.; in this procedure virtually all of the NCO groups can be reacted.

A disadvantage of syntheses involving such a solvent based procedure is that the solvent has to be removed again subsequently if the blocked polyisocyanates are to be used in the powder coatings field. This measure would also have to be carried out at mild temperatures, below the unblocking temperature, in vacuo with the use of thin-film evaporators, filmtruders or extruders, but hitherto it has not been technically possible to carry out this measure given the extremely high viscosities of these products.

The object of the present invention is therefore to provide a less complex process which is beneficial to product quality, or, in general, a process, for the preparation of totally or partially blocked polyisocyanates having low to extremely high viscosities for the formulation of PUR coating systems, which process does not have the disadvantages mentioned.

Surprisingly it has been found that the blocking of the NCO group and/or chain extension in a direct, continuous, solventless procedure in the melt, despite the high melt viscosity, if certain process conditions are observed; in many cases chain extension can be carried out concurrently with the blocking, in the form of a one-step process. In accordance with the process described below, polyisocyanates can be blocked inter alia at high temperatures, already well within the range in which the blocking groups are detached, without instances of cloudiness and/or discoloration occurring in the reaction product and without greater contents of free NCO being formed than in the synthesis of the crosslinking agent in solvent.

SUMMARY OF THE INVENTION

The present invention relates to a process for the preparation of totally or partially blocked polyisocyanates based on a blocking agent and on a polyisocyanate containing at least two free NCO groups, if desired, in the presence of a chain extender, which process is characterized in that the totally or partially blocked polyisocyanates are prepared by a solvent-free and continuous procedure.

The principle of the process consists in the fact that the reactants are mixed continuously and homogeneously in an intensive mixer or intensive kneading apparatus and are heated at suitably, high temperatures for short periods, the reactants undergoing substantial or complete reaction, and are then cooled in a controlled manner in accordance with the establishment of equilibrium, it being possible to achieve complete conversion.

DETAILED DESCRIPTION OF THE PREFERRED EMBODIMENTS

Intensive mixers, especially static mixers, are employed for products of low viscosities ≦150,000 mPa.s, preferably ≦100,000 mPa.s, in particular ≦50,000 mPa.s at 130° C., while intensive kneading apparatus is employed for products having high viscosities of ≧150,000 mPa.s.

The static mixer can consist of one or more parallel pipes around which a cold- and heat-transfer medium flows and in which fixed internals ensure that a transverse flow component is superimposed on a liquid flowing through in the longitudinal direction, effecting not only a rapid homogenization effect but also permanent temperature compensation by convective heat transport in the radial direction, as well as a standardization of the residence times.

As examples of intensive kneading apparatuses which can be employed for carrying out the synthesis comprises Conterna machines and specifically single-screw and multi-screw extruders, in particular twin-screw extruders.

In the intensive kneading apparatus, the appropriate and known equipping of the mixing chambers and the composition of the screw geometry bring about, on the one hand, an intensive and rapid mixing of the highly viscous product streams coupled with intensive heat exchange and, on the other hand, uniform flow in the longitudinal direction with a substantially constant residence time. The individual housings or sections of the apparatus can be regulated at different temperatures.

The reaction products are fed to the static mixer or intensive kneading apparatus in separate product streams at between room temperature and 120° C. Where there are more than two product streams, these can also be fed in combined form. The blocking agent(s) and/or chain extender and/or catalysts, in other words not starting materials and additives which react with one another can, be combined to form one product stream.

It is also possible to carry out the actual blocking reaction in a static mixer and only subsequently to carry out an addition reaction, for example the addition of chain extender, in an intensive kneading apparatus.

The temperatures in the static mixer should be from 80° C. to 190° C., preferably from 100° C. to 160° C., and in particular from 130° C. to 150° C. A zone for after-reaction can be attached.

The temperatures in the intensive kneading apparatus or extruders are from 60° C. to 200° C., in particular from 90° C. to 180°, and in particular from 100° to 170° C. A zone for after-reaction can be appended.

Examples of apparatus which can be employed for the subsequent, controlled cooling and/or after-reaction are tube bundles, pipe coils, metal conveyor belts, air conveyors, cooling rolls and the like, in which it should be possible to set temperature gradients and/or temperature zones.

The final stages of processing begin, depending on the viscosity of the product leaving the static mixer or intensive kneading apparatus and/or the after-reaction zone, first by further cooling, using appropriate apparatus as mentioned above, to a temperature which is adequate for subsequent bag-filling/containerization operations, with comminution being carried out prior to bag-filling. During cooling, at a suitable point, preimpression of the product, which is obtained preferably in the form of a strip, can be carried out in order to prepare for and facilitate subsequent comminution into a desired particle size or granular form using a roll-type crusher, pin mill, hammer mill or the like, and to reduce the amount of dust formed. If an array of cooling rolls is used, this preimpression can be combined with the comminution, and the dust formed subsequently can be returned directly and reincorporated into the product.

Suitable starting compounds for the product synthesized in accordance with the invention are the following polyisocyanates: aliphatic, (cyclo)aliphatic and araliphatic diisocyanates as described in, for example, Houben-Weyl, Methoden der organischen Chemie (Methods of Organic Chemistry), volume 14/2, pp. 61–70, and in the article by W. Siefken in Justus Liebigs Annalen der Chemie 562, pp. 75–136, such as 1,4-tetramethylene diisocyanate, 1,6-hexamethylene diisocyanate, methylpentamethylene diisocyanate, 2,2,4(2,4,4)-trimethyl-1,6-hexamethylenediisocyanate (TMDI), cyclohexane 1,3- and 1,4-diisocyanate, 3-isocyanatomethyl-3,5,5-trimethylcyclohexyl isocyanate (isophorone diisocyanate, IPDI), hexahydrodurene diisocyanate, 4,4'-diisocyanatodicyclohexylmethane (HMDI), hexahydroxylylene 1,4-diisocyanate and 1,3-diisocyanate, and m- or p-tetramethylxylylene diisocyanate.

The term polyisocyanates in the context of the present invention also refers to oligomers, together if desired with monomeric diisocyanates, which contain isocyanurate, biuret or urethane groups and which are prepared by known methods of isocyanate chemistry. These oligomers are employed in particular in the intensive kneading apparatus. The term also refers to those polyisocyanates which are prepared by molecular enlargement using the so-called chain extenders common in isocyanate chemistry, such as diols and/or triols, in which case the ratio of OH to NCO equivalents can be 1:2 to 7.

Examples of diols are ethylene glycol (E), propylene glycol, such as 1,2- and 1,3-propanediol, 2,2-dimethylpropane-1,3-diol (NPG), butane-1,4-diol, diethylene glycol (DEG), hexanediol (RD), 3-methylpentanediol, 2,2,4-(2,4,4)-trimethylhexanediol (TMH-d), dodecane-1,12-diol, octadecane-1,18-diol, neopentylglycol hydroxypivalate, and trans- and cis-1,4-cyclohexanedimethanol (CHDM). Within the context of the invention, diols also include those compounds which, in addition to the OH groups, may also contain from 1 to 10 ester groups in the molecule and are prepared, for example, by condensation of diols with dicarboxylic acids according to the equation

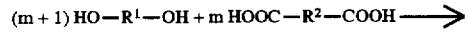

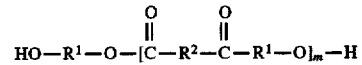

where $R^1$ is an optionally substituted $C_{2-18}$-alkylene radical, $R^2$ is an optionally substituted $C_{2-10}$-alkylene radical or a 1,2-, 1,3- or 1,4-phenylene radical and m is 1–15.

The polyols include trimethylolethane, trimethylolpropane (TMP), trishydroxyethyl isocyanurate (THEIC), pentaerythritol, dipentaerythritol, sorbitol and mannitol.

Common blocking agents are phenols, alcohols, ethyl acetoacetate, lactams, especially caprolactam (CL), oximes, especially acetone oxime, methyl ethyl ketoxime (MEK-ox), cyclohexanone oxime (C-ox) and methyl isobutyl ketoxime, and imidazolines, in particular phenylimidazoline. The NCO: blocking agent ratio is preferably from 1:1.2–0.5.

To accelerate the reaction, both in the case of chain extension and in the case of blocking, it is possible to employ catalysts. Suitable catalysts are organic $Sn^{II}$, $Zn^{II}$ and $Sn^{IV}$ compounds such as tin octanoate, dibutyl tin dilaurate (DBTL) and dibutyltin diacetate, or zinc octanoate, and other compounds which are known and conventional in isocyanate chemistry. The concentration of catalyst is generally between 0.01 and 2% by weight, preferably between 0.05 and 1% by weight.

The present invention furthermore relates to the use of the polyisocyanates blocked in accordance with the invention for the production of storage-stable, heat-curable PUR powder coatings and solvent-containing, one-component PUR stoving enamels.

Suitable co-reactants for PUR powder coatings are compounds which contain those functional groups which react with isocyanate groups during the curing process as a function of temperature and time, for example hydroxyl, carboxyl, mercapto, amino, urethane and (thio)urea groups. Polymers which can be employed are addition polymers, condensation polymers and polyaddition compounds.

Preferred co-reactants are primarily polyethers, polythioethers, polyacetals, polyesteramides, epoxy resins containing hydroxyl groups in the molecule, amino resins and their modification products with polyfunctional alcohols, and also polyazomethines, polyurethanes, polysulphonamides, melamine derivatives, cellulose esters and ethers, partially hydrolysed homo- and copolymers of vinyl esters, but especially polyesters and acrylate resins.

The hydroxyl group-containing polyesters to be employed have an OH functionality of from 2 to 5, preferably from 3 to 4.2, an average molecular weight (Mw) of from 1,800 to 5,000 preferably from 2,300 to 4,500, an OH number of from 25 to 180 mg of KOH/g, preferably from 30 to 140 mg of KOH/g, a viscosity at 160° C. of <80,000 mPa.s, preferably <60,000 mPa.s and particularly preferably 40,000 mPA.S, and a melting point of ≧70° C. and ≧120° C., preferably ≦75° C. and ≦100° C.

Carboxylic acids which are preferred for the preparation of polyesters may be aliphatic, cycloaliphatic, aromatic and/or heterocyclic in nature and may—if desired be substituted by halogen atoms and/or unsaturated. Examples are succinic, adipic, suberic, azelaic, sebacic, phthalic, terephthalic (Ts), isophthalic (Is), trimellitic, pyromellitic, tetrahydrophthalic, hexahydrophthalic, hexahydroterephthalic, di- and tetrachloro- phthalic, endomethylenetetrahydrophthalic, glutaric, maleic and fumaric acid and, where accessible, their anhydrides, dimethyl terephthalate (DMT), bisglycol terephthalate and also cyclic monocarboxylic acids such as benzoic acid, p-tert-butylbenzoic acid or hexahydro-benzoic acid.

Examples of suitable polyhydric alcohols are ethylene glycol, 1,2-propylene glycol and 1,3-propylene glycol, 1,4-butylene glycol and 2,3-butylene glycol, di-o-hydroxyethylbutanediol, hexane-1,6-diol, octane-1,8-diol, neopentylglycol, cyclohexanediol, 1,4-bis(hydroxymethyl) cyclohexane, 2,2-bis(4-hydroxycyclohexyl)propane, 2,2-bis [4-(β-hydroxyethoxy)phenyl]propane, 2-methylpropane-1, 3-diol, 3-methylpentane-1,3-diol, 3-methylpentane-1,5-diol, 2,2,4(2,4,4)-trimethylhexane-1,6-diol, glycerol, trimethylolpropane, trimethylolethane, hexane-1,2,6-triol, butane-1,2,4-triol, tris(β-hydroxyethyl) isocyanurate, pentaerythritol, mannitol and sorbitol, and also diethylene glycol, triethylene glycol, tetraethylene glycol, dipropylene glycol, polypropylene glycols, polybutylene glycols, xylylene glycol and neopentylglycol hydroxypivalate.

Mono- and polyesters of hydroxycarboxylic acids, for example hydroxypivalic acid, ω-hydroxydecanoic acid, ω-hydroxycaproic acid and thioglycolic acid can also be employed, as can lactones, for example ε-caprolactone. Also suitable are polyesters of the above-mentioned polycarboxylic acids or their derivatives with polyphenols, such as hydroquinone, bisphenol A, 4,4'-di-hydroxybiphenyl or bis (4-hydroxyphenyl) sulphone; polyesters of carbonic acid obtainable from hydroquinone, diphenylolpropane, p-xylylene glycol, ethylene glycol, butanediol or hexane-1, 6-diol and other polyols by conventional condensation reactions, for example with phosgene or diethyl or diphenyl carbonates, or from cyclic carbonates such as glycol carbonate or vinylidene carbonate, by polymerization in a known manner. Further compounds which can be employed are polyesters of salicylic acid, polyesters of phosphoric acid, for example from methane-, ethane-, β-chloroethane-, benzene- or styrenephosphoric acid or the corresponding phosphoryl chlorides or phosphoric esters and polyalcohols or polyphenols of the type mentioned above; polyesters of boric acid; polysiloxanes, for example the products which are obtainable by hydrolysis of dialkyldichlorosilanes with water followed by treatment with polyalcohols, and the products obtainable by addition reaction of poly-siloxane dihydrides with olefins such as allyl alcohol or acrylic acid.

Other preferred polyesters are the reaction products of polycarboxylic acids with glycidyl compounds, as described, for example, in DE-A 24 10 513.

Examples of glycidyl compounds which can be used are esters of 2,3-epoxy-1-propanol with monobasic acids having from 4 to 18 carbon atoms, such as glycidyl palmitate, glycidyl laurate and glycidyl stearate, alkylene oxides having from 4 to 18 carbon atoms, such as butylene oxide, and glycidyl ethers such as octyl glycidyl ether. The dicarboxylic acids which can be used in this process are all those polycarboxylic acids listed below under II; it is also possible to employ monocarboxylic acids, which are listed under III by way of example.

Other preferred co-reactants are monomeric esters, for example bis-hydroxy(alcohol) esters of dicarboxylic acids, esters of monocarboxylic acids with polyols having a functionality of more than two, and oligoesters which can be prepared by condensation reactions from the raw materials which are customary in paint chemistry. Examples of materials regarded as customary are:

I. Alcohols having 2 to 24, preferably 2 to 10, carbon atoms and 2 to 6 OH groups which are attached to non-aromatic carbon atoms, for example ethylene glycol, propylene glycol, diethylene glycol, dipropylene glycol, butanediols, neopentylglycol, hexanediols, hexanetriols, perhydrobisphenol, di-methylolcyclohexane, glycerol, trimethylolethane, trimethylolpropane, pentaerythritol, dipentaerythritol and mannitol;

II. di- and polycarboxylic acids having 4 to 36 carbon atoms and 2 to 4 carboxyl groups and esterifiable derivatives thereof, such as anhydrides and esters, for example phthalic acid (anhydride), isophthalic acid, terephthalic acid, alkyltetrahydrophthalic acids, endomethylenetetrahydrophthalic anhydride, adipic acid, succinic acid, maleic acid, fumaric acid, dimeric fatty acids, trimellitic acid, pyromellitic acid and azelaic acid;

III. monocarboxylic acids having 6 to 24 carbon atoms, for example caprylic acid, 2-ethylhexanoic acid, benzoic acid, p-tert-butylbenzoic acid, hexahydrobenzoic acid, mixtures of monocarboxylic acids from natural oils and fats, such as coconut fatty acid, soya-oil fatty acid, castor oil fatty acid, hydrogenated and isomerized fatty acids, such as "Konjuvandol" fatty acid and mixtures thereof; it is also possible to employ the fatty acids as glycerides and to react them by transesterification and/or dehydration;

IV. monohydric alcohols having 1 to 18 carbon atoms, for example methanol, ethanol, isopropanol, cyclohexanol, benzyl alcohol, isodecanol, nonanol, octanol and oleyl alcohol.

The polyesters can be obtained in a manner known per se by condensation in an inert gas atmosphere at temperatures of from 100° to 260° C., preferably from 130° to 220° C., in the melt or in an azeotropic procedure, as described in, for example, Methoden der Organischen Chemie [Methods of Organic Chemistry) (Houben-Weyl), volume 14/2, 1–5, 21, 23, 40, 44, Georg Thieme Verlag, Stuttgart, 1963 or in C. R. Martens, Alkyd Resins, 51–59, Reinhold Plastics Appl. Series, Reinhold Publishing Comp., New York, 1961.

Preferred acrylate resins for possible use as the OH component are homo- or copolymers, examples of monomers which can be selected as starting products being the following: esters of acrylic acid and methacrylic acid with dihydric, saturated, aliphatic alcohols having 2 to 4 carbon atoms, for example 2-hydroxyethyl acrylate, 2-hydroxypropyl acrylate, 4-hydroxybutyl acrylate and the corresponding methacrylates; alkyl acrylates and methacrylates having 1 to 18 carbon atoms in the alcohol component, for example methyl acrylate, ethyl acrylate, propyl acrylate, isopropyl acrylate, n-butyl acrylate, tert-butyl acrylate, 2-ethylhexyl acrylate, stearyl acrylate and the corresponding methacrylates; cyclohexyl acrylate and methacrylate; acrylonitrile and methacrylonitrile, acrylamide and methacrylamide; and N-methoxymethyl(meth)acrylamide.

Particularly preferred acrylate resins are copolymers of a. from 0 to 50% by weight of esters of acrylic or methacrylic acid with dihydric or polyhydric alcohols, such as 1,4-butanediol monoacrylate, hydroxypropyl (meth)acrylate; and also vinylglycol, vinylthioethanol, allyl alcohol and 1,4-butanediol monovinyl ether;

b. from 5 to 95% by weight of esters of acrylic acid or methacrylic acid with monohydric alcohols containing from 1 to 12 carbon atoms, for example methyl methacrylate, ethyl acrylate, n-butyl acrylate or 2-ethylhexyl acrylate;

c. from 0 to 50% by weight of aromatic vinyl compounds, such as styrene, methyl styrene or vinyltoluene;

d. from 0 to 20% by weight of other monomers having functional groups, for example acrylic acid, methacrylic acid, crotonic acid, itaconic acid, maleic acid, fumaric acid, maleic anhydride, maleic monoesters, acrylamide, methacrylamide, acrylonitrile or N-methylol(meth)acrylamide and glycidyl(meth) acrylate, the proportion of group a. and/or b. being at least 5% by weight.

The acrylate resins can be prepared by the conventional methods, i.e. by solution, suspension, emulsion or precipitation polymerization, but preferably by bulk polymerization which, in turn, can be initiated by UV light.

Further polymerization initiators which are used are the conventional peroxides or azo compounds, for example dibenzoyl peroxide, tert-butylperbenzoate or azobisisobutyronitrile. The molecular weight can be regulated using, for example, sulphur compounds such as tert-dodecanethiol.

Preferred polyethers can be prepared, for example, by the polyaddition of epoxides, such as ethylene oxide, propylene oxide, butylene oxide, trimethylene oxide, 3,3-bis (chloromethyl)oxacyclobutane, tetrahydrofuran, styrene oxide, the bis(2,3-epoxypropyl) ether of diphenylolpropane or epichlorohydrin with itself, for example in the presence of $BF_3$, or by the addition of these epoxides, if desired as a mixture or in succession, with starting components containing reactive hydrogen atoms, such as alcohols or amines, for example water, ethylene glycol, 1,3-propylene glycol or 1,2-propylene glycol, pentamethylene glycol, hexanediol, decamethylene glycol, trimethylolpropane, 4,4'-dihydroxydiphenylpropane, aniline, ammonia, ethanolamine, ethylenediamine, di($\beta$-hydroxypropyl) methylamine, di($\beta$-hydroxyethyl)aniline, hydrazine, and also hydroxyalkylated phenols, for example O,O-di($\beta$-hydroxyethoxy) resorcinol.

It is also possible to employ polyureas and/or polyurethanes containing hydroxyl groups as co-reactants.

As polyhydroxy co-reactant compounds it is also possible, of course, to employ mixtures of two or more substances.

The ratio in which the hydroxyl group-containing co-reactant polymer and the isocyanate component are mixed is generally selected such that 0.6–1.2, preferably 0.8–1.1, especially preferably 1.0 free and/or blocked NCO groups are present per OH group.

For the production of PUR powder coatings, the isocyanate component is mixed and homogenized in the melt with the appropriate hydroxyl group-containing co-reactant polymer and, if desired, catalysts and also pigments, fillers and levelling agents, for example silicone oil, and acrylate resins. This can be carried out in suitable apparatus, for example heatable kneading apparatus, but preferably by extrusion, in which case upper temperature limits of from 130° to 140° C. should not be exceeded. After the extruded composition has been cooled to room temperature and comminuted appropriately, it is ground to give the ready-to-spray powder. The application of the ready-to-spray powder to suitable substrates can be carried out by the known processes, for example by electrostatic powder spraying, fluidized-bed sintering, or electrostatic fluidized-bed sintering. After the application of the powder, the coated workpieces are heated for curing purposes for from 60 to 6 minutes at a temperature of from 150° to 220° C., preferably for from 30 to 8 minutes at from 180° to 210° C.

For the production of solvent-containing, one-component PUR stoving enamels, the isocyanate component can be dissolved in appropriate solvents and homogenized with the hydroxyl group-containing polyesters/acrylate co-reactant resins which are suitable for this area of application, and can be formulated in a known manner with the above-mentioned additives. Solvents suitable for the one-component stoving enamels according to the invention are those whose lower boiling point is about 100° C. The upper limit of the boiling point of the solvent depends on the respective baking temperatures. If baking is carried out at relatively high temperatures, the boiling points of the solvents to be used must be at relatively high temperatures. Suitable solvents include the following: hydrocarbons, such as toluene, xylene, Solvesso® 100, 150 and 200 (mixtures of aromatic compounds from Esso), tetraline, decaline, esters such as, for example, butyl acetate and hexyl acetate, ethylglycol acetate, butylglycol acetate, methoxypropyl acetate (MOP-A) etc., and ketones such as, for example, methyl isobutyl ketone, diisobutyl ketone and isophorone. The solvents mentioned can also be employed as mixtures.

The one-component PUR stoving enamels are suitable, in particular, for application to metal surfaces, but also to articles made from other materials such as glass or plastic. The coating materials according to the invention also find application in coil-coating, for weather resistant one-coat and two-coat systems. The application of the solvent-containing and optionally pigmented coating systems is carried out by knife coating, roller coating, spraying, pouring etc. The curing of the one component PUR stoving enamels according to the invention is carried out, depending on the application, in a temperature range of from 140° to 350° C., preferably at between 180° and 300° C., in a period of from 30 minutes to 30 seconds. The coated films exhibit outstanding technological properties, especially with regard to flexibility and weather resistance.

The process according to the invention is described below with reference to examples. In these examples the metering of the reaction components is not dealt with in more detail but is carried out using the conventional metering pumps and/or belt weighers.

A. Preparation of the process products according to the invention in an intensive mixer I. Synthesis of blocked polyisocyanates containing urethane groups General Preparation procedure Examples in accordance with Table 1

A mixture of IPDI and DBTL and, in parallel, a mixture comprising diol or triol and blocking agent were fed continuously into a static mixer whose temperature was regulated at from 80° to 150° C. The product flows were metered in at between room temperature and 120° C.

The spontaneous reaction in the static mixer resulted in a rise in temperature to from 130° to 200° C. The system pressure, as a function of throughput and temperature, was between 2 and 25 bar.

A temperature-controlled pipe coil was attached to the mixer and was used to ensure an adequate residence period for after-reaction. The average residence time was between 5 and 30 minutes.

At the end of the pipe coil the reaction mixture was shaped, cooled and bagged or cooled, comminuted or shaped and bagged. The products produced in this way had NCO values of $\leq 0.6\%$ free and $\leq 15.9\%$ total.

The spontaneous reaction in the static mixer resulted in a rise in temperature to from 130° to 200° C. The system pressure, as a function of throughput and temperature, was between 2 and 25 bar.

A temperature-controlled pipe coil was attached to the mixer and was used to ensure an adequate residence period for after-reaction. The average residence time was between 5 and 30 minutes.

TABLE 1

|  | Composition in mol | | | Chemical and physical characteristics | | | |
|---|---|---|---|---|---|---|---|
|  | | | | NCO content (% by wt.) | | | Glass transition |
| Example A I | Diisocyanate | Diol/triol | Blocking agent | Free | Total | Melting range °C. | temp. °C. |
| 1 | IPDI 2 | DEG 1 | CL 2 | 0.4 | 10.6 | 76–82 | 41–53 |
| 2 | IPDI 2 | E 1 | CL 2 | 0.6 | 11.1 | 87–94 | 45–59 |
| 3 | IPDI 2 | DEG 1 | MEK-ox 2 | 0 | 11.5 | 65–68 | 22–45 |
| 4 | IPDI 2 | HD 1 | CL 2 | 0.3 | 10.2 | 73–78 | 40–49 |
| 5 | IPDI 3 | NPG 1 | MEK-ox 4 | 0 | 14.6 | 66–70 | 28–38 |
| 6 | IPDI 4 | NPG 1 | CL 6 | 0.5 | 14.8 | 72–74 | 43–54 |
| 7 | IPDI 4 | CHDM 1 | MEK-ox 6 | 0.1 | 15.9 | 57–60 | 20–29 |
| 8 | HMDI 4 | NPG 1 | CL 6 | 0.4 | 13.5 | 70–74 | 41–55 |
| 9 | IPDI 3 | THEIC 1 | CL 3 | 0 | 9.8 | 118–120 | 47–64 |
| 10 | IPDI 3 | TMP 1 | CL 3 | 0.3 | 10.8 | 113–118 | 43–62 |
| 11 | IPDI 4 | TMP 1 | CL 5 | 0.3 | 12.7 | 99–104 | 45–67 |
| 12 | IPDI 4.5 | TMP 1 | MEK-ox 6 | 0.1 | 14.6 | 66–68 | 29–40 |
| 13 | IPDI 6 | THEIC 1 | CL 9 | 0.4 | 14.4 | 81–83 | 46–62 |
| 14 | IPDI 6 | TMP 1 | CL 9 | 0.6 | 14.9 | 79–82 | 43–59 |
| 15 | HMDI 6 | TMP 1 | CL 9 | 0.5 | 13.6 | 80–85 | 45–60 |

II. Synthesis of blocked polyisocyanates containing isocyanurate and/or isocyanate groups.
General preparation procedure Examples in accordance with Table 2

A mixture of isocyanurate and IPDI or HMDI having a set content of NCO, in which the catalyst was dissolved, was fed continuously and simultaneously, together with a blocking agent, into a static mixer whose temperature was regulated at from 80° to 150° C. The two product streams were metered in at between room temperature and 150° C.

At the end of the pipe coil the reaction mixture was shaped, cooled and bagged or cooled, comminuted or shaped and bagged. The products produced in this way had NCO values of $\leq 3.2\%$ free and $\leq 16.5\%$ total.

TABLE 2

|  | Composition in mol | | | Chemical and physical characteristics | | | |
|---|---|---|---|---|---|---|---|
|  | Isocyanurate/diisocyanate mixture | | | NCO content (% by wt.) | | | Glass transition |
| Example A II | (NCO content/% by weight) |  | Blocking agent | Free | Total | Melting range °C. | temp. °C. |
| 1 | IPDI-IS/IPDI (25) | 59.74 | CL 40.26 | 0.5 | 14.6 | 88–92 | 43–65 |
| 2 | IPDI-IS/IPDI (24) | 66.8 | MEK-ox 33.2 | 0 | 15.5 | 87–89 | 36–53 |
| 3 | IPDI-IS/IPDI (25) | 64.98 | CL 35.02 | 3.2 | 16.1 | 75–79 | 40–59 |
| 4 | IPDI-IS/IPDI (26) | 64.98 | MEK-ox 35.02 | 0 | 16.5 | 67–70 | 24–37 |
| 5 | IPDI-IS/IPDI (26) | 58.8 | CL 41.2 | 0.3 | 15.1 | 86–89 | 46–63 |
| 6 | IPDI-IS/IPDI (26) | 62.67 | CL 37.33 | 2.4 | 16.1 | 75–78 | 42–58 |
| 7 | IPDI-IS/IPDI (27) | 57.87 | CL 42.13 | 0.4 | 15.3 | 79–85 | 28–52 |
| 8 | IPDI-IS/IPDI (28.2) | 56.82 | CL 43.18 | 0.5 | 15.6 | 75–78 | 26–50 |
| 9 | IPDI-IS/HMDI (26) | 58.8 | CL 41.2 | 0.3 | 15.0 | 69–71 | 36–56 |
| 10 | IPDI-IS/HMDI (23.3) | 61.4 | CL 38.6 | 0.4 | 14.0 | 92–94 | 52–70 |
| 11 | HMDI-IS/HMDI (26) | 58.8 | CL 41.2 | 0.5 | 15.0 | 59–61 | 30–44 |
| 12 | HMDI-IS/IPDI (26) | 58.8 | CL 41.2 | 0.4 | 15.1 | 65–67 | 40–53 |
| 13 | IPDI-IS/DESMODUR ®N 3300* (18.9) | 66.36 | CL 33.64 | 0.3 | 12.1 | 80–83 | 41–62 |
| 14 | IPDI-IS/DESMODUR ®N 3200* (18.7) | 66.5 | CL 33.5 | 0.4 | 12.3 | 89–92 | 43–65 |

*DESMODUR N 3200 = biuret of hexamethylene 1,6-diisocyanate
DESMODUR N 3300 = isocyanurate of hexamethylene 1,6-diisocyanate
IS = Isocyanurate B. Polyol component
General preparation procedure The starting components, terephthalic acid (Ts) and/or isophthalic acid (Is) and/or dimethyl terephthalate (DMT), hexane-1,6-diol (HD) and/or neopentylglycol (NPG) and/or 1,4-dimethylolcyclohexane (DMC) and/or 2,2,4(2,4,4)-trimethylhexanediol (TMH-d) and trimethylolpropane (TMP), are placed in a reactor and heated using an oil bath. After the greater part of the substances has melted, 0.05% by weight of di-n-butyltin oxide as catalyst are added at a temperature of 160° C. Elimination of methanol first occurs at a temperature of about 170° C. Over the course of from 6 to 8 h the temperature is raised to from 200° to 230° C. and, over the course of a further 12 to 15 h, the reaction is brought to completion. The polyester is cooled to 200° C. and substantially freed from volatile components by applying a vacuum (1.33 mbar) over the course of from 30 to 45 min. Throughout the reaction period the bottom product is stirred and a gentle stream of $N_2$ is passed through the reaction mixture.

The following table gives the composition of the polyester and the corresponding physical and chemical characteristics.

if desired with the white pigment, in an edge runner mill and then homogenized in an extruder at from 80° to 140° C. After it has cooled, the extrudate is fractionated and ground to a particle size of <100 μm using a pin mill. The powder thus prepared is applied to degreased and, if desired, pretreated iron panels using an electro-static powder spraying unit at 60 kV, and baked in a circulating-air laboratory drying cabinet at temperatures of between 160° and 200° C.

Levelling agent master batch 10 percent by weight of the levelling agent, a commercially available copolymer of butyl acrylate and 2-ethylhexyl acrylate, are homogenized in the melt in the appropriate polyester and, after solidifying, are comminuted.

The abbreviations in the following tables denote:

LT=Layer thickness in μm

HK=Konig hardness (sec) (DIN 53 157)

HB=Buchholz hardness (DIN 53 153)

EI=Erichsen indentation (mm) (DIN 53 156)

CH=Crosshatch test (DIN 53 151)

GG 20° <

TABLE 3

Polyesters

| Example B | Starting components | | | | | | Chemical and physical characteristics | | | | |
|---|---|---|---|---|---|---|---|---|---|---|---|
| | Ts mol | DMT mol | HD mol | NPG mol | DMC mol | TMP mol | OH number mg KOH/g | Acid number mg KOH/g | Melting range °C | DTA* °C | Visc. at 160° C. mPa · s |
| 1 | 10 | 10 | 6.25 | 10.5 | 2 | 2.9 | 55–60 | 3–4 | 75 | 50 | 25,000 |
| 2 | Polyester from Hoechst AG ALFTALAT AN 739 | | | | | | 55–60 | 2–3 | 70 | 50 | 28,000 |
| 3 | 9 IS | 9 | 3 | 13 TMH-d | 3 | 1 | 52–55 | 2–4 | 73–75 | 50 | 10,000 |
| 4 | 7 | — | 5 | 1 | — | 2 | 105–112 | <2 | — | (−3) (+9) | — |
| 5 | 10 | — | 7.5 | — | — | 4 | 135–141 | <2 | — | — | — |

*Glass transition temperature

C. Polyurethane powder coatings
General preparation procedure

The ground products, crosslinking agent, polyester and levelling agent master batch are intimately mixed, together GG 60° < =measurement of gloss according to Gardner (ASTM-D 523)

Imp. rev.=Impact reverse (g.m)

TABLE 4

Pigmented powder coatings

| Example C | 1 | 2 | 3 | 4 | 5 | 6 | 7 | 8 | 9 | 10 | 11 | 12 |
|---|---|---|---|---|---|---|---|---|---|---|---|---|
| Formulation | | | | | | | | | | | | |
| Crosslinking agent acc. to AI (Example) | 17.76 (1) | 17.74 (6) | 15.09 (8) | 17.53 (10) | 14.06 (12) | 14.21 (13) | 13.84 (14) | — | — | — | — | — |
| Crosslinking agent acc. to AII (Example) | — | — | — | — | — | — | — | 13.43 (2) | 13.7 (5) | 12.71 (9) | 12.71 (11) | 16.17 (13) |
| Polyester acc. to B1 | — | 41.26 | 43.91 | — | — | — | — | — | — | — | — | — |
| Polyester acc. to B2 | 41.24 | — | — | 41.47 | 44.94 | 44.79 | 45.16 | 45.57 | 45.3 | — | — | 42.83 |
| Polyester acc. to B3 | — | — | — | — | — | — | — | — | — | 46.29 | 46.29 | — |

Notes: All formulations contain 40% by weight of $TiO_2$ (white pigment) and in each case 0.5% by weight of levelling agent and Benzoin; the OH/NCO ratio is 1:1

Coating data

| | | | | | | | | | | | | |
|---|---|---|---|---|---|---|---|---|---|---|---|---|
| LT | 50–60 | 60–70 | 60 | 50–60 | 25–30 | 50–65 | 60–65 | 25–35 | 50–60 | 40–50 | 60–70 | 40–50 |
| HK | 170 | 186 | 170 | 201 | 181 | 181 | 188 | 191 | 185 | 179 | 173 | 178 |
| HB | 100 | 100 | 111 | 111 | 111 | 125 | 111 | 111 | 100 | 111 | 111 | 100 |

TABLE 4-continued

| | Pigmented powder coatings | | | | | | | | | | | |
|---|---|---|---|---|---|---|---|---|---|---|---|---|
| Example C | 1 | 2 | 3 | 4 | 5 | 6 | 7 | 8 | 9 | 10 | 11 | 12 |
| CH | 0 | 0 | 0 | 0 | 0 | 0 | 0 | 0 | 0 | 0 | 0 | 0 |
| GG 60° * | 91 | 88 | 88 | 85 | 85 | 86 | 87 | 85 | 87 | 90 | 90 | 86 |
| EI | >10 | >10 | >10 | 9.7→10 | 6.8–7.5 | 9.8→10 | 9.6→10 | >10 | >10 | >10 | >10 | >10 |
| Imp. rev. | 806.4 | >944.6 | >944.6 | >944.6 | 345.6 | >944.6 | >944.6 | >944.6 | >944.6 | >944.6 | >944.6 | >944.6 |

Notes: Curing conditions: 200° C./12–15 min; *160° C./25 min.

D. One-component polyurethane stoving enamels

I. Preparation of the crosslinking agent solution 600 parts by weight of the blocked polyisocyanates prepared according to A I or A II were dissolved with stirring in 400 parts by weight of solvent mixture at 80°–90° C., and the flow time was determined in a DIN 4 cup at 20° C.

a) A I 9
n-Butyl acetate/xylene (3:5)=1,208 seconds b) A I 14
MOP-A/xylene/Solvesso® 100 (1:1:1)=271 seconds c) A II 5
n-Butyl acetate/xylene (3:5)=50 seconds d) A II 13
n-Butyl acetate/xylene (3:5)=103 seconds II. Preparation of the Polyester solution 600 parts by weight of polyester according to B 4 and B 5 were dissolved with stirring in 400 parts by weight of solvent mixture at 80–90° C., and the flow time was determined in a DIN 4 cup at 20° C.

a) B 4
1) n-Butyl acetate/xylene (3:5)=271 seconds
2) MOP-A/xylene/Solvesso® 100 (1:1:1)=430 seconds b) B 5
1) n-butyl acetate/xylene (3:5)=471 seconds III. Preparation of the one-component PUR stoving enamels a) Stock enamel solution The 60% strength polyester solution was homogenized with stirring with the calculated quantity of the 60% strength crosslinking agent solution at 60°–80° C., and the flow time was determined in a DIN 4 cup at 20° C.

1) According to Example D I a and according to Example D II b=964 seconds
2) According to Example D I b and according to Example D II a2=352 seconds
3) According to Example D I c and according to Example D II a1=168 seconds
4) According to Example D I d and according to Example D II b=277 seconds b) Pigmented enamel solutions The stock enamel solutions prepared according to D III a) were, if necessary, admixed with further solvent mixture, corresponding to the stock solution, and then milled with white pigment (TiO₂) and an anti-foam and levelling agent conventional in PUR chemistry in a stirred ball mill.

These pigmented enamels were applied to degreased and/or pretreated 0.8–1 mm steel and/or aluminum panels; curing was carried out in a circulating-air laboratory drying cabinet; the curing temperatures were between 180° and 250° C.; the thickness of the enamel films was, depending on the application, between 25 and 50 μm.

TABLE 5

| Pigmented one-component stoving enamels | | | | |
|---|---|---|---|---|
| Example D III b Formulation | 1 | 2 | 3 | 4 |
| Crosslinking agent solution acc. to D I a | 33.1 | — | — | — |
| Crosslinking agent solution acc. to D I b | — | 22.4 | — | — |
| Crosslinking agent solution acc. to D I c | — | — | 25.8 | — |
| Crosslinking agent solution acc. to D I d | — | — | — | 31.2 |
| Polyester solution acc. to D II a1 | — | — | 47.0 | — |
| Polyester solution acc. to D II a2 | — | 41.3 | — | — |
| Polyester solution acc. to D II b | 34.6 | — | — | 40.1 |
| Solvent mixture acc. to the enamel solution employed | 7.0 | 5.1 | — | 2.1 |
| White pigment (TiO₂) | 24.2 | 30.0 | 26.0 | 25.5 |
| Antifoam (Byk-special) | 1.0 | 1.0 | 1.1 | 1.0 |
| Levelling agent (silicone oil OL) | 0.1 | 0.1 | 0.1 | 0.1 |
| Technological properties | | | | |
| HK | 197 | 194 | 199 | 204 |
| HB | 125 | 125 | 111 | 125 |
| GG 20° * | 83 | 73 | 78 | 77 |
| GG 60° * | 92 | 89 | 92 | 91 |
| CH | 0 | 0 | 0 | 0 |
| EI | 7.0 | 7.9 | 8.2 | 7.2 |
| Pencil hardness | 2H | 2H | 2H | 2H |

Note: Curing: 250°/150 seconds

AA. Preparation of the process products according to the invention in an intensive kneading apparatus I. Synthesis of totally or partially blocked poly-isocyanates without chain extenders, in accordance with Table 6

The blocking agent and the isocyanurate (IPDI-Is) produced from isophorone diisocyanate, or a mixture of IPDI-Is and Desmodur N 3300 or Desmodur N 3200 or IPDI, were introduced simultaneously and continuously into the intake housing of a twin-screw extruder. The blocking agent was metered in at a temperature of from 20° to 120° C. and the polyisocyanate component at a temperature of from 60° to 160° C. The catalyst was dissolved in one of the two components. The extruder employed is composed of 10 housings thermally controlled over 5 heating zones. The temperatures of the heating zones were regulated as follows: 1st heating zone 130°–150° C., 2nd zone 110°–180° C., 3rd zone 90°–150° C., 4th zone 80°–160° C. and 5th zone 70°–150° C. The twin screw employed for intensive mixing and conveying was divided into conveying zones and kneading zones. The speed of rotation of the twin screw is from 50 to 380 rpm. The reaction product, which is obtained at a rate of from 10 to 180 kg/h, was either cooled, then comminuted or shaped and bagged or the melt itself was shaped, cooled and bagged. In order to complete the conversion, the product may be passed through a heated thermal tunnel.

TABLE 6

| Example AAI | Composition (% by weight) Isocyanurate/diisocyanate mixture (NCO content/% by weight) | | Blocking agent | Chemical and physical characteristics | | Melting range °C. | Glass transition temp. °C. |
|---|---|---|---|---|---|---|---|
| | | | | NCO content (% by wt.) | | | |
| | | | | Free | Total | | |
| 1 | IPDI-Is (17.2) | 68.4 | CL 31.6 | 0.5 | 11.6 | 135–140 | >90 |
| 2 | IPDI-Is (17.2) | 81.2 | CL 18.8 | 5.6 | 13.7 | 125–129 | >70 |
| 3 | IPDI-Is (17.2) | 76.4 | CL 23.6 | 4.4 | 13.1 | 136–138 | >90 |
| 4 | IPDI-Is (17.2) | 74.2 | CL 25.8 | 3.2 | 12.8 | 130–135 | >90 |
| 5 | IPDI-Is (17.2) | 77.0 | Ac-ox 23.0 | 0.1 | 13.1 | 135–137 | >90 |
| 6 | IPDI-Is (17.2) | 73.7 | MEK-ox 26.3 | 0 | 12.7 | 115–120 | >70 |
| 7 | IPDI-Is (17.2) | 76.8 | MEK-ox 23.2 | 2.0 | 13.1 | 104–114 | >60 |
| 8 | IPDI-Is (17.2) | 62.6 | *Phim 37.4 | 0.8 | 10.6 | 137–142 | >90 |
| 9 | IPDI-Is (17.2) | 71.5 | *Phim 28.5 | 4.1 | 12.1 | 134–138 | >90 |
| 10 | IPDI-Is (17.2) | 60.6 | *Phim 39.4 | 0.3 | 10.3 | 135–138 | >70 |
| 11 | IPDI-Is/IPDI (20) | 65.0 | CL 35.0 | 0.3 | 12.9 | 125–132 | >80 |
| 12 | IPDI-Is/IPDI (20) | 74.1 | CL 25.9 | 5.1 | 14.8 | 113–117 | >70 |
| 13 | IPDI-Is/Desm N 3300 (17.6) | 67.9 | CL 32.1 | 0.3 | 11.8 | 125–131 | >60 |
| 14 | IPDI-Is/Desm N 3200 (17.6) | 67.9 | CL 32.1 | 0.2 | 11.7 | 122–128 | >55 |
| 15 | IPDI-Is/Desm N 3300 (18.0) | 67.4 | CL 32.6 | 0.3 | 12.0 | 110–115 | >50 |

Notes:
*Phim = phenylimidazoline
Desmodur N 3200 = biuret of hexamethylene diisocyanate
Desmodur N 3300 = isocyanurate of hexamethylene diisocyanate II. Synthesis of totally or partially blocked polyisocyanates with chain extenders, in accordance with Table 7

Blocked polyisocyanate, chain-extended using hydroxy ester, was prepared by feeding IPDI-Is at a temperature of from 150° to 190° C. into a twin-screw extruder, simultaneously metering in a mixture of hydroxy ester according to Example B 6 and blocking agent at a temperature of from 50° to 120° C. The quantitative ratios of these components were such that the NCO equivalents were equal to the sum of OH equivalents and moles of blocking agent. The NCO:OH ratio was about 3:1. The reaction can be carried out without addition of catalyst. The extruder employed is composed of 10 housings which are thermally controlled over 5 heating zones. The temperatures of the heating zones were regulated as follows: 1st heating zone 130°–200° C., 2nd zone 110°–180° C., 3rd zone 90°–150° C., 4th zone 80°–160° C. and 5th zone 70°–150° C. The speed of rotation of the twin screw was from 100 to 300 rpm. The twin screw is composed of conveying zones and kneading zones. The reaction product was then conveyed through a temperature-controlled thermal tunnel.

The reaction product, obtained at a rate of from 10 to 100 kg/h, was cooled and comminuted.

The physical and chemical characteristics are compiled in Table 7.

TABLE 7

| Example AA II Composition | units | 1 | 2 | 3 | 4 |
|---|---|---|---|---|---|
| IPDI-Is | % by wt. | 49.10 | 49.10 | 50.3 | 50.2 |
| Polyester acc. to II 6 | % by wt. | 35.90 | 35.90 | 36.1 | 36.0 |
| Blocking agent | % by wt. | 15.00 CL | 15.00 C-ox | 13.6 MEK-ox | 13.8 C-ox |
| Chemical and physical characteristics | | | | | |
| NCO content | | | | | |
| cold | % by wt. | 0.1 | 0.1 | 0.1 | 0.6 |

TABLE 7-continued

| Example AA II Composition | units | 1 | 2 | 3 | 4 |
|---|---|---|---|---|---|
| total | % by wt. | 5.5 | 5.4 | 5.6 | 5.7 |
| Melting range | °C. | 75–85 | 75–90 | 71–74 | 72–81 |
| Glass transition temperature | °C. | 40–60 | 40–65 | 35–63 | 36–59 |

BB. Polyol component

General preparation procedure

The starting components—terephthalic acid (Ts) and/or isophthalic acid (Is) and/or adipic acid (As) and/or dimethyl terephthalate (DMT), hexane-1,6-diol (HD) and/or neopentylglycol (NPG) and/or 1,4-dimethylolcyclohexane (DMC) and/or 2,2,4(2,4,4)-trimethylhexanediol (TMH-d) and trimethylolpropane (TMP)—are placed in a reactor and heated using an oil bath. After the greater part of the substances has melted, 0.05% by weight of di-n-butyltin oxide as catalyst are added at a temperature of 160° C. Elimination of methanol first occurs at a temperature of about 170° C. Over the course of from 6 to 8 h the temperature is raised to from 200° to 230° C. and, over the course of a further 12 to 15 h, the reaction is brought to completion. The polyester is cooled to 200° C. and substantially freed from volatile components by applying a vacuum (1.33 mbar) over the course of from 30 to 45 min. Throughout the reaction period the bottom product is stirred and a gentle stream of $N_2$ is passed through the reaction mixture.

Table 8 below gives the compositions of the polyesters and the corresponding physical and chemical characteristics.

TABLE 8

Polyesters

| Example BB | Starting components | | | | | | Chemical and physical characteristics | | | | |
|---|---|---|---|---|---|---|---|---|---|---|---|
| | Ts mol | DMT mol | HD mol | NPG mol | DMC mol | TMP mol | OH number mg KOH/g | Acid number mg KOH/g | Melting range °C. | DTA* °C. | Visc. at 160° C. mPa · s |
| 1 | 10 | 10 | 6.25 | 10.5 | 2 | 2.9 | 55–60 | 3–4 | 75 | 50 | ~25,000 |
| 2 | Polyester from Hoechst AG ALFTALAT AN 739 | | | | | | 55–60 | 2–3 | 70 | 50 | ~28,000 |
| 3 | Polyester from UCB/Belgium Crylcoat 2392 | | | | | | 27–33 | 2–3 | 85–100 | >50 | ~35,000 |
| 4 | Is 7 | — | 5 | — | TMH-d 1 | 2 | 105–112 | <2 | — | (−3) — (+9) | — |
| 5 | 10 As | — | 7.5 | — | — | 4 | 135–141 | <2 | — | — | — at 25° C. in mPa · s |
| 6 | 4 | — | 2 | 3 | — | — | 100–110 | <2 | — | — | 3–4,000 |

CC. Polyurethane powder coatings

General preparation procedure

The ground products, crosslinking agent, polyester and levelling agent and/or catalyst master batch are intimately mixed, together if desired with the white pigment, in an edge runner mill and then homogenized in an extruder at from 80° to 140° C. After it has cooled, the extrudate is fractionated and ground to a particle size of <100 μm using a pin mill. The powder thus prepared is applied to degreased and, if desired, pretreated iron panels using an electrostatic powder spraying unit at 60 kV, and baked in a circulating-air drying cabinet at temperatures of between 160° and 200° C.

Levelling agent master batch 10 per cent by weight of the levelling agent, a commercially available copolymer of butyl acrylate and 2-ethylhexyl acrylate, are homogenized in the melt in the appropriate polyester and, after solidifying, are comminuted.

Catalyst master batch 5 per cent by weight of the catalyst—DBTL—are homogenized in the melt in the appropriate polyester and, after solidifying, are comminuted.

The abbreviations in the following tables have been explained above (p. 22).

TABLE 9

Pigmented powder coatings

| Example CC | 1 xo(a) | 2 xo(a) | 3 xx(a) | 4 xx(b) | 5 xxo(a) | 6 xo(a) | 7 xx(b) | 8 xxo(a) | 9 xx(a) | 10 xx(b) | 11 xx(a) | 12 xx(a) |
|---|---|---|---|---|---|---|---|---|---|---|---|---|
| Formulation | | | | | | | | | | | | |
| Crosslinking agent acc. to AAI (Example) | 27.4 (1) | 17 (1) | 16.27 (1) | 13.78 (1) | 10.07 (1) | 14.79 (2) | 7.24 (2) | 9.1 (3) | 15.22 (6) | 9.36 (6) | 15.05 (6) | 9.24 (11) |
| Polyester acc. to BB2 | 71.95 | — | 42.73 | 45.22 | — | — | — | — | 43.78 | 49.64 | — | 49.76 |
| Polyester acc. to BB3 | — | 82.35 | — | — | 48.78 | 84.56 | 51.76 | 49.75 | — | — | 43.95 | — |

Notes: x clearcoat, xx pigmented coating material (40% by weight of TiO₂, 0.5% by weight of benzoin) all formulations contain 0.5% by weight of levelling agent. o 0.15% by weight of DBTL, OH/NCO = 1:1 (a), 1:0.8 (b)

Coating data

| | | | | | | | | | | | | |
|---|---|---|---|---|---|---|---|---|---|---|---|---|
| LT | 35–45 | 30–40 | 50–60 | 60–70 | 50–60 | 45–50 | 60–70 | 60–70 | 15–25 | 15–20 | 20 | 60–70 |
| HK | 215 | 218 | 194 | 203 | 193 | 215 | 199 | 201 | 198 | 196 | 199 | 194 |
| HB | 125 | 111 | 111 | 125 | 111 | 125 | 125 | 111 | 111 | 111 | 125 | 111 |
| CH | 0 | 0 | 0 | 0 | 0 | 0 | 0 | 0 | 0 | 0 | 0 | 0 |
| GG 60° ← | — | — | 85 | 84 | 88 | — | 87 | 88 | 87 | 87 | 89 | 87 |
| EI | >10 | >10 | 8.8–9.0 | 7.7–8.2 | >10 | >10 | >10 | >10 | >10 | >10 | >10 | >10 |
| Imp. rev. | >944.6 | >944.6 | 691.2 | 806.4 | >944.6 | >944.6 | >691.2 | 806.4 | >944.6 | >944.6 | >944.6 | 806.4 |

Notes: Curing conditions: 200° C./10 min. (x); 15 min. (xx)

TABLE 10

Pigmented powder coatings

| Example CC | 13 xx(a) | 14 xx(a) | 15 xx(a) | 16 xx(a) | 17 xx(a) | 18 xx(a) | 19 xx(b) | 20 xx(a) | 21 xxo(a) | 22 xx(b) | 23 xx(a) | 24 xx(a) |
|---|---|---|---|---|---|---|---|---|---|---|---|---|
| Formulation | | | | | | | | | | | | |
| Crosslinking agent acc. to AA I | 15.8 (11) | 16.07 (11) | 16.17 (13) | 15.87 (14) | 9.82 (15) | 13.42 (15) | 12.84 (15) | — | — | — | — | — |

TABLE 10-continued

| | Pigmented powder coatings | | | | | | | | | | | |
|---|---|---|---|---|---|---|---|---|---|---|---|---|
| Example CC | 13 xx(a) | 14 xx(a) | 15 xx(a) | 16 xx(a) | 17 xx(a) | 18 xx(a) | 19 xx(b) | 20 xx(a) | 21 xxo(a) | 22 xx(b) | 23 xx(a) | 24 xx(a) |
| (Example) Crosslinking agent acc. to AA II | — | — | — | — | — | — | — | 26.28 (1) | 26.21 (1) | 23.08 (1) | 26.55 (2) | 26.02 (3) |
| (Example) Polyester acc. to BB1 | 43.2 | — | — | — | — | — | — | — | — | — | — | — |
| Polyester acc. to BB2 | — | 42.93 | 42.83 | 43.13 | — | 45.58 | 46.16 | 32.72 | 32.64 | 35.42 | 32.45 | 32.48 |
| Polyester acc. to BB3 | — | — | — | — | 46.18 | — | — | — | — | — | — | — |

Notes: x clearcoat, xx pigmented coating material (40% by weight of $TiO_2$, 0.5% by weight of benzoin) all formulations contain 0.5% by weight of levelling agent. o 0.15% by weight of DBTL, OH/NCO = 1:1 (a), 1:0.8 (b)

Coating data

| | | | | | | | | | | | | |
|---|---|---|---|---|---|---|---|---|---|---|---|---|
| LT | 55–60 | 50–60 | 50–60 | 65–75 | 60–75 | 50–60 | 60–70 | 50–55 | 50–60 | 50–55 | 50–60 | 60–70 |
| HK | 191 | 193 | 198 | 201 | 197 | 199 | 201 | 183 | 185 | 186 | 184 | 185 |
| HB | 111 | 125 | 111 | 111 | 125 | 111 | 125 | 105 | 105 | 100 | 100 | 100 |
| CH | 0 | 0 | 0 | 0 | 0 | 0 | 0 | 0 | 0 | 0 | 0 | 0 |
| GG 60° | 89 | 88 | 87 | 88 | 87 | 89 | 88 | 85 | 86 | 85 | 87 | 88 |
| EI | >10 | >10 | >10 | >10 | >10 | >10 | >10 | >10 | >10 | >10 | >10 | >10 |
| Imp. rev. | >944.6 | >944.6 | >691.2 | 806.4 | 806.4 | 944.6 | 806.4 | >944.6 | 806.4 | >944.6 | 806.4 | 806.4 |

Notes: Curing conditions: 200° C./10 min. (x): 15 min. (xx)

DD. One-component polyurethane stoving enamels

I. Preparation of the crosslinking agent solution 600 parts by weight of the blocked polyisocyanate adducts prepared according to AA I or AA II were dissolved with stirring in 400 parts by weight of solvent mixture at 80°–90°C., and the flow time was determined in a DIN 4 cup at 20° C.

a) AA I.1
n-Butyl acetate/xylene (3:5)=370 seconds b) AA I.6
n-Butyl acetate/xylene (3:5)=290 seconds c) AA I.11
n-Butyl acetate/xylene (3:5)=305 seconds d) AA I.15
n-Butyl acetate/xylene (3:5)=180 seconds II. Preparation of the polyester solution 600 parts by weight of polyester according to BB 4 and BB 5 were dissolved with stirring in 400 parts by weight of solvent mixture at 80°–90° C., and the flow time was determined in a DIN 4 cup at 20° C.

a) BB 4
n-Butyl acetate/xylene (3:5)=271 seconds b) BB 5
n-Butyl acetate/xylene (3:5)=471 seconds III. Preparation of the one-component PUR stoving enamels a) Stock enamel solution The 60% strength polyester solution was homogenized with stirring with the calculated quantity of the 60% strength crosslinking agent solution at 60°–80° C., and the flow time was determined in a DIN 4 cup at 20° C.

1) According to Example DD I.a and according to Example DD II.b=360 sec
2) According to Example DD I.a and according to Example DD II.a=305 sec
3) According to Example DD I.b and according to Example DD II.b=410 sec
4) According to Example DD I.c and according to Example DD II.a=330 sec
5) According to Example DD I.d and according to Example DD II.b=320 sec
6) According to Example DD I.d and according to Example DD II.a=270 sec b) Pigmented enamel solutions The stock enamel solutions prepared according to DD III a) were if necessary admixed with further solvent mixture, corresponding to the stock solution, and then milled with white pigment ($TiO_2$) and an anti-foam and levelling agent conventional in PUR chemistry in a stirred ball mill.

These pigmented enamels were applied to degreased and/or pretreated 0.8–1 mm steel and/or aluminum panels; curing was carried out in a circulating-air laboratory drying cabinet; the thickness of the enamel films was, depending on the application, between 25 and 50 µm.

TABLE 11

| | Pigmented one-component stoving enamels | | | | | |
|---|---|---|---|---|---|---|
| Example DD III.b | 1 | 2 | 3 | 4 | 5 | 6 |
| Formulation | o | o | x | x | o | o |
| Crosslinking agent solution ac. to DD I.a | 31.9 | 28.9 | — | — | — | — |
| Crosslinking agent solution acc. to DD I.b | — | — | 30.1 | — | — | — |
| Crosslinking agent solution acc. to DD I.c | — | — | — | 30.3 | — | — |
| Crosslinking agent solution acc. to DD I.d | — | — | — | — | 31.3 | 28.2 |
| Polyester solution acc to DD II.a | — | 41.7 | — | — | — | 42.3 |
| Polyester solution acc to DD II.b | 38.6 | — | 37.6 | 40.2 | 39.2 | — |
| Solvent mixture acc. to the enamel solution employed | 3.1 | 3.1 | 7.0 | 3.2 | 3.1 | 3.2 |
| White pigment ($TiO_2$) | 25.2 | 25.2 | 24.2 | 25.2 | 25.2 | 25.2 |
| Antifoam (Byk-special) | 1.1 | 1.0 | 1.0 | 1.0 | 1.1 | 1.1 |
| Levelling agent (silicone oil OL) | 0.1 | 0.1 | 0.1 | 0.1 | 0.1 | 0.1 |
| Technological properties | | | | | | |
| HK | 216 | 204 | 210 | 198 | 204 | 201 |
| HB | 125 | 111 | 125 | 111 | 125 | 125 |
| GG 20° | 80 | 75 | 88 | 77 | 74 | 78 |
| GG 60° | 91 | 90 | 96 | 92 | 91 | 92 |
| CH | 0 | 0 | 0 | 0 | 0 | 0 |
| EI | 7.5 | 7.3 | 7.8 | 7.6 | 8.1 | 8.0 |

TABLE 11-continued

Pigmented one-component stoving enamels

| Example DD III.b | 1 | 2 | 3 | 4 | 5 | 6 |
|---|---|---|---|---|---|---|
| Formulation | o | o | x | x | o | o |
| Pencil hardness | 2H | H-2H | 2H | 2H | H-2H | H-2H |

Note:
Curing:
250° C./150 seconds (o)
200° C./6 minutes (x)

Obviously, numerous modifications and variations of the present invention are possible in light of the above teachings. It is therefore to be understood that within the scope of the appended claims, the invention may be practiced otherwise than as specifically described herein.

This application is based on German patent Application P 44 06 443.8 filed with the German Patent Office on Feb. 28, 1994, the entire contents of which are hereby incorporated by reference.

What is claimed as new and desired to be secured by Letters Patent of the United States is:

1. A polyurethane coating powder comprising:

i) a totally or partially blocked polyisocyanate prepared by continuously reacting in an apparatus selected from the group consisting of an intensive kneading apparatus, a single screw extruder and a multi-screw extruder a blocking agent and a polyisocyanate containing at least two free NCO groups, wherein said reaction is solvent-free to result in a blocked polyisocyanate having a viscosity of $\geq 150,000$ mPa s at 130° C.; and ii) a hydroxy group containing co-reactant polymer.

2. A solvent-containing polyurethane stoving enamel comprising:

i) a totally or partially blocked polyisocyanate prepared by continuously reacting in an apparatus selected from the group consisting of an intensive kneading apparatus, a single screw extruder and a multi-screw extruder a blocking agent and a polyisocyanate containing at least two free NCO groups, wherein said reaction is solvent-free to result in a blocked polyisocyanate having a viscosity of $\geq 150,000$ mPa s at 130° C.;

ii) a hydroxy group containing co-reactant polymer; and iii) a solvent.

\* \* \* \* \*